Patented Nov. 2, 1943

2,333,203

UNITED STATES PATENT OFFICE 2,333,203

CELLULOSE FIBERS AND PROCESS OF TREATING THEM

Erik Schirm, Dessau in Anhalt, Germany, assignor, by mesne assignments, to General Aniline & Film Corporation, New York, N. Y., a corporation of Delaware No Drawing. Application July 24, 1937, Serial No. 155,571. In Germany September 28, 1932

4 Claims. (Cl. 8—120)

This application is a continuation-in-part of U. S. patent application Serial No. 690,034, (now U. S. P. No. 2,120,267) filed September 18, 1933, in the name of Erik Schirm.

The invention relates to the improvement of cellulose materials; more particularly, it relates to enhancing the colorability of natural or regenerated cellulose. It is an object of the invention to improve cellulose materials by exposing them to the simultaneous action of aldehydes and ketones and of derivatives of aldehydes and ketones and heterocyclic bases or their salts with strong acids, for instance, pyridines and quinolines, or isoquinolines. By "strong acids" the mineral acids are meant in general, yet one may likewise employ organic sulfonic acids or ester acids derivable from poly-basic mineral acids. If in this case one chooses sulfonic or ester acids, the hydrocarbon residue of which corresponds to soap-forming carboxylic acids, such as cetyl-sulfonic acid, octadecyl-sulfuric acid, sulforicinol- or sulfo-oleic acid, one obtains simultaneously with the forming of the "amine yarn" also a softening effect.

By the treatment according to the present invention hydrophobic properties are in many cases imparted to the fibers, particularly in case compounds containing a high molecular aliphatic radical are used.

In employing such aldehyde- or ketone derivatives which may be considered as esters of strong acids, such as chloromethyl acetate, ethylidene-bromide, benzal chloride or alpha-halogen ether of the general formula

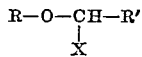

(X=halogen, R and R' represent aryl radicals or aliphatic hydrocarbon radicals such as: alkyl, cycloalkyl, aralkyl, R' also hydrogen), such as butylchloromethyl ether, the mere presence of the free pyridine base will suffice, the latter being obviously transformed by itself in the reaction mixture into the corresponding salt, i. e. into the chlor- or brom-hydrate, respectively.

In some cases reaction occurs easily between the aldehyde- or ketone derivatives and the heterocyclic bases. When compounds of the formula

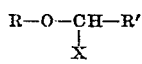

such as mentioned above, are used, there may be formed addition compounds of the following formula

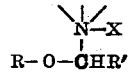

For the present process there may, of course, be used these addition products instead of the individual components.

The conversion is advantageously done in presence of indifferent diluents. For this purpose the pyridine bases which are destined for the conversion, may be employed, in a free form, as well as the hydrocarbons, chlorinated hydrocarbons, nitrobenzene and similar materials which are much in use as diluents. The presence of certain amounts of the free base besides its salt has proved advantageous with regard to the preservation of the fiber.

The temperatures at which the reactions are conducted vary according to the reaction capacity of the aldehyde or ketone or derivative employed. Formaldehyde and its derivatives react the most easily, generally at temperatures of less than 100° C., whereas the other aldehydes and the ketones as well as their derivatives require somewhat higher temperatures.

On employing monomerous, low aliphatic aldehydes and ketones and derivatives the process is preferably conducted in closed vessels and under pressure. The same procedure should be followed when working with easily volatile pyridine bases, e. g. pyridine itself and/or diluents boiling at low temperatures such as chloroform or trichloroethylene, if the reaction does not occur at all or rapidly enough at their boiling points.

Some illustrative examples for the treatment of cellulose are given below, followed by a description of the improvement in the dyeing properties of the treated cellulose. They only serve to illustrate the invention and are not intended to limit it thereto; the parts are by weight:

(1) 1 parts of ethylidenediacetate is mixed with 30 parts of a mixture of pyridine bases such as are used for making denaturated alcohol, whereupon 1 part of pyridine hydrochloride is added. Two parts of cotton are then added and the whole is heated for 4 hours to 120° C., whereupon the cotton is separated from the reaction mixture and washed and dried.

The ethylidenediacetate may be replaced by acetal.

(2) 1 part of benzalchloride, 1 part of cotton and 20 parts of pyridine are boiled for 7 hours at the reflux-cooler. The separation and after-treatment of the cotton is the same as described above.

(3) 1 part of butylchloromethyl ether is stirred into 10 parts of pyridine free of water and as soon as the development of warmth is terminated, one adds 1 part of cotton, which is kept in the bath for 4 hours under a thorough working at water-bath temperature. Then one squeezes off or centrifuges and one washes out with the pyridine or alcohol; the washing agent is then removed and the thus treated cotton is dyed.

Instead of the butylchloromethyl ether one may likewise employ with the same good result the chloromethyl- or alpha-chloroethyl ethers, respectively, of other alcohols such as methyl-, ethyl-, propyl-, amyl-, cyclohexyl- or benzyl-alcohol.

(4) 2 parts of dry pyridine are introduced into a solution of 2 parts of hexadecylchloromethyl ether in 250 parts of carbon tetrachloride and cotton material is treated for 20 minutes with this solution. Thereupon, the material is centrifuged and dried at 100° C. to 110° C.

(5) Artificial silk crêpe is impregnated for 20 minutes at ordinary temperature with an aqueous solution of 1 per cent. strength of the addition product of stearylchloromethyl ether and pyridine. The goods are then squeezed and heated for 1 hour at 90° C. to 100° C.

As to the colorability the cellulose fiber preliminarily treated according to the present invention is like the so-called "amine-yarn," i. e. it is dyed directly by all dyestuffs and dyestuff intermediates of an acid character, therefore by the direct cotton dyestuffs, the so-called "acid" wool dyestuffs, further by mordant dyestuffs, such as alizarine, logwood- or yellowwood extract and others, by sulfuric acid ester salts of vat-dyestuffs ("indigosoles"), by the 2:3-hydroxynaphthoic acid-arylides etc.

The present invention, therefore, facilitates the manufacture of equal dyeings on mixture-fabrics made of cellulose fiber and animal fiber, since it places at one's disposal a richer selection of dyestuffs which possess about the same drawing power for the animal fiber as well as for the cellulose fiber preliminarily treated according to the invention.

Substantive dyestuffs draw on the new yarn by far more energetically than on ordinary cellulose fiber and these dyeings are in many cases considerably faster to washing than on ordinary cellulose fiber; this may be explained by the fact, that the dyestuff owing to its special constitution is not only adsorbed by the cellulose (as it is also the case with ordinary substantive dyeings), but simultaneously also chemically bound to the substrate by its sulfo-groups as a quaternary ammonia salt.

If a preliminarily treated and wetted material is brought into a cold bath which contains in the usual bath length (1:10 to 1:20) or in a larger one the usual percentages of its weight of any substantive dyestuff (e. g. Congo-red, Diamine-brown M, Diamine-blue BB; Schultz-Julius, Farbstofftabellen 1914, Nr. 307, 344, 337, and others), the dyestuff draws in a short time completely on the fiber, even in the absence of the otherwise usual admixtures, such as common salt, sodium sulfate, sodium carbonate etc. These dyeings are much faster to washing than those on ordinary cellulose. Also non-substantive acid dyestuffs such as Orange II, Fast-red A, Alizarine saphirol B (Schultz-Julius, loc. cit. Nr. 145, 161, 858) show a similar drawing capacity already in the cold, whereas other ones such as Naphthylamine black D (Schultz-Julius, loc. cit. Nr. 266) draw on better when warm, at about 60° C. One can also observe, that dyestuffs capable of drawing on completely or nearly completely when cold, are partially bleeding out during the heating of the bath, whereas on cooling down the bath they again draw on entirely. With regard to the uniform dyeing it is, however, recommended to perform the dyeings as usual in a heated bath.

The usual methods to enhance the fastness to washing of dyeings on the cellulose fiber consisting in diazotizing the dyestuff on the fiber and in developing with azo-components, as well as the after-treatment of suitable dyestuffs on the fiber with diazonium compounds, may likewise be adopted for the cellulose fiber preliminarily treated according to the invention, but the circle of the dyestuffs considered for the purpose is then considerably enlarged. Thus, as an example, it is possible to diazotize on the fiber a dyeing of Naphthylamine-black D (see above) used hitherto only as wool dyestuff, and to develop with an alkaline solution of beta-naphthol to a neutral dark black. In an analogous manner the dyestuff Naphthylamine-brown S (Schultz-Julius, loc. cit. Nr. 160) can be dyed on and developed with diazotized para-nitraniline to a washing-fast brown.

Also the chrome development-dyestuffs for wool, such as Eriochrome-red B (Schultz-Julius, loc. cit. Nr. 29) can be dyed upon the new yarn and developed with chromates in the well-known manner during or after the dyeing and preferably in a slightly acid solution.

Particularly remarkable is the further fact, that not only dyestuffs and their intermediates but also other compounds with acid properties such as tannic acids, fatty acids, resin- and naphthene acids, sulfonated fats and oils, as well as ester salts of polyvalent mineral acids with higher fatty or naphthene alcohols and furthermore the fatty acid-compounds of the isoethionic acid or of the taurin or of similar compounds, are bound by the fiber preliminarily treated according to the present invention. Moreover, it is remarkable that those of the aforementioned classes of materials which possess the properties of soaps or soap-formers, produce quite excellent softening and smoothing effects. A particular advantage of this smoothing and softening compared with that on ordinary cellulose, consists, on the one hand, in that it is perfectly fast to the washing, since the soaps or soap-like products employed for the washing operation exert a smoothing and softening action upon the new yarn, on the other hand, one can simultaneously dye and smooth or soften the yarn by adding the dyestuff and smoothing or softening agent to the treatment bath in the desired proportions and then proceeding in the usual way.

I claim:

1. The process of enhancing the colorability of natural and regenerated cellulose which comprises treating the fibers at an elevated temperature with compounds of the group consisting of pyridines and quinolines in the presence of an indifferent diluent, as which the aforesaid bases may serve themselves, and simultaneously with a compound of the formula:

wherein R'' represents a member of the group consisting of aliphatic hydrocarbon radicals containing up to six carbon atoms and benzyl, and Hal represents halogen.

2. The process of enhancing the colorability of natural and regenerated cellulose which comprises treating the fibers at an elevated temperature with compounds of the group consisting of pyridines and quinolines in the presence of an indifferent diluent, as which the aforesaid bases may serve themselves, and simultaneously with compounds of the formula:

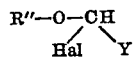

wherein R'' represents a member of the group consisting of hydrocarbon radicals containing up to six carbon atoms and benzyl, Hal represents halogen and Y stands for a member of the group consisting of hydrogen and methyl.

3. Cellulose textile materials having improved colorability and water repellent properties and being the product of the process as defined in claim 1.

4. Cellulose textile materials having improved colorability and water repellent properties and being a product of the process as defined in claim 1.

ERIK SCHIRM.

Certificate of Correction

Patent No. 2,333,203.　　　　　　　　　　　　　　　　　November 2, 1943.

ERIK SCHIRM

It is hereby certified that errors appear in the printed specification of the above numbered patent requiring correction as follows: Page 1, first column, line 40, after "radicals" insert a comma; and second column, line 43, for "1 parts" read *1 part*; page 3, second column, line 1, before "hydrocarbon" insert *aliphatic*; line 12, for the claim reference numeral "1" read *2*; and that the said Letters Patent should be read with these corrections therein that the same may conform to the record of the case in the Patent Office.

Signed and sealed this 11th day of June, A. D. 1946.

[SEAL]

LESLIE FRAZER,
*First Assistant Commissioner of Patents.*